United States Patent [19]

Lotsch et al.

[11] Patent Number: 4,845,214

[45] Date of Patent: Jul. 4, 1989

[54] PROCESS FOR CONDITIONING ISOINDOLINE PIGMENTS

[75] Inventors: Wolfgang Lotsch, Beindersheim; Reinhard Kemper, Heidelberg, both of Fed. Rep. of Germany

[73] Assignee: BASF Aktiengesellschaft, Ludwigshafen, Fed. Rep. of Germany

[21] Appl. No.: 882,359

[22] Filed: Jul. 7, 1986

[30] Foreign Application Priority Data

Jul. 5, 1985 [DE] Fed. Rep. of Germany ....... 3524110

[51] Int. Cl.[4] .............................................. C09B 57/04
[52] U.S. Cl. ................................... 544/250; 106/401; 544/252; 544/296; 544/300
[58] Field of Search ............... 544/250, 252, 296, 300; 106/288 Q

[56] References Cited

U.S. PATENT DOCUMENTS

| | | | |
|---|---|---|---|
| 3,127,412 | 3/1964 | Gaertner et al. | 106/288 Q |
| 3,923,806 | 12/1975 | Bock et al. | 544/300 |
| 4,166,179 | 8/1979 | Lotsch | 544/296 |
| 4,262,120 | 4/1981 | von der Crone | 544/300 |
| 4,480,097 | 10/1984 | Lotsch et al. | 544/296 |
| 4,525,591 | 6/1985 | Lotsch et al. | 544/250 |
| 4,645,539 | 2/1987 | Lotsch et al. | 106/288 Q |
| 4,655,845 | 4/1987 | Spietschka et al. | 106/288 Q |
| 4,680,387 | 7/1987 | Kranz | 540/137 |
| 4,719,300 | 1/1988 | Lotsch | 544/284 |

FOREIGN PATENT DOCUMENTS 67370 6/1981 Japan.
2014176 8/1979 United Kingdom.

OTHER PUBLICATIONS

Sumitomo Chemical Co. Ltd. Chemical Abstract 95-171106R.
Kranz; CA 19997j, eq. DE3442118.
Lerner et al., CA96-87026s (1982).
Lotsch et al., CA102-168366x.

*Primary Examiner*—Donald G. Daus
*Assistant Examiner*—Cecilia Shen
*Attorney, Agent, or Firm*—Oblon, Spivak, McClelland, Maier & Neustadt

[57] ABSTRACT

Isoindoline pigments are conditioned by means of a heat treatment of the pigment in a mixture of water and benzenemonocarboxylic and/or benzenedicarboxylic acids.

Well crystallized, very weatherfast pigmentary forms which give colorations possessing improved purity of shade are obtained.

17 Claims, No Drawings

PROCESS FOR CONDITIONING ISOINDOLINE PIGMENTS

DISCUSSION OF THE BACKGROUND

Processes for conditioning (also referred to as finishing or recrystallizing) isoindoline pigments are disclosed in, for example, German Laid-Open Application DOS No. 2,628,409, Examples 4 and 5, and DOS No. 2,800,815, Examples 1, 2 and 3, and in EP-A No. 38 548, Examples 1 to 5. The processes are carried out in such a way that the condensate of diiminoisonidoline and barbituric acid (molar ratio 1:2) is heated for several hours at >100° C. in water or a mixture of water and ethylene glycol, depending on the particle size desired.

In order to obtain particularly well crystallized, coarsely crystalline and hence particularly high-hiding and weatherfast pigmentary forms, it is necessary to carry out conditioning under superatmospheric pressure and at temperatures substantially above 100° C., or to accept very long treatment times at below 100° C. Because of the partial decomposition of the isoindoline pigments under these finishing conditions, extremely coarse-particled pigmentary forms, which exhibit very high weatherfastness, can be obtained only with a loss of yield.

SUMMARY OF THE INVENTION

It is an object of the present invention to provide a further process for conditioning isoindoline pigments, which makes it possible to prepare coarse-particled pigmentary forms of isoindoline pigments in a controlled manner under mild conditions and/or in a fairly short time.

We have found that good results are achieved in a process for conditioning an isoindoline pigment by treating a suspension of the pigment at elevated temperature in a mixture of water and one or more benzene monocarboxylic and/or benzene dicarboxylic acids.

DETAILED DESCRIPTION OF THE PREFERRED EMBODIMENTS

Compared with the prior art processes, the novel process of this invention is able to give well crystallized, very weatherfast pigmentary forms in better yields, either after a shorter conditioning time at the same temperature or when using a lower temperature for the same conditioning time. As a rule, the products according to the invention possess better purity of shade and greater weatherfastness as a full shade. Using the novel process, it is possible to prepare, for example, extremely coarse-particled pigmentary forms of the condensate of diiminoisoindline with barbituric acid. Because of partial decomposition of the isoindoline pigments under the conditions of the prior art processes, such pigmentary forms are virtually impossible to obtain by the conventional processes.

The process according to the invention is generally carried out by heating a suspension of the isoindoline pigment in a mixture of water and one or more benzene mono- and/or dicarboxylic acids to the desired temperature and keeping it at this temperature until the desired pigmentary form is obtained or the pigment has reached the desired particle size.

Particularly suitable isoindoline pigments for treatment by the process according to the invention are those of the general formula (I)

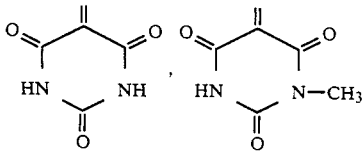

where A is

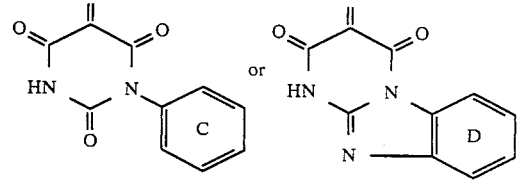

and the rings B, C and D are unsubstituted or substituted by one or more radicals which do not impart solubility.

Isoindoline pigments of the formula I which are preferably treated using the novel process are those in which rings B and D are unsubstituted and ring C is substituted by methoxy.

Particularly advantageous pigmentary forms are obtained if the dye of the formula II

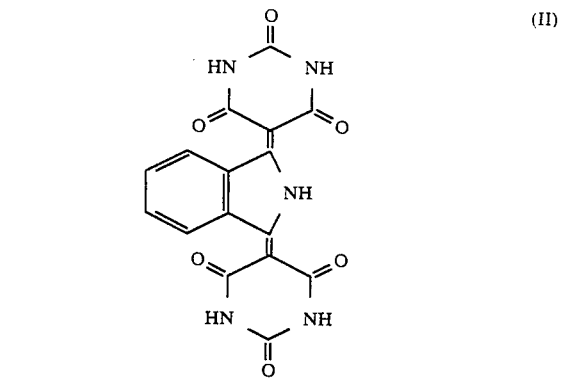

is conditioned by the process according to the invention.

Furthermore, mixtures of pigments of the formula (I) and mixtures of the pigment of the formula (II) and isoindoline pigments of the formula (III)

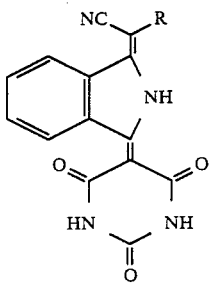

(III)

can be converted to pigmentary forms which give colorations possessing improved weatherfastness. In formula (III), R is —CN, —CONH$_2$, N—C$_1$—C$_4$-alkylcarbamyl, N-phenylcarbamyl, 2-quinazolonyl, 2-quinoxalinoyl or 2-benzimidazolyl. Pigments of this type are described in German Laid-Open Application DOS No. 3,327,564.

Suitable benzene monocarboxylic and benzene dicarboxylic acids for the novel process include benzoic acid, m-, o- and p-toluic acid, salicylic acid, phthalic acid, isophthalic acid, terephthalic acid and mixtures of these. Benzoic acid and phthalic acid are preferred, the former being particularly preferred.

The amount of benzene monocarboxylic and/or benzene dicarboxylic acids can be varied within wide limits, depending on the desired increase in particle size. The acids are, preferably, used in amounts of from 20 to 200, particularly preferably from 50 to 100, % by weight based on the pigment.

As a rule, the pigments of the formula (I) or the pigment mixtures are used in the form of water-moist crude pigments, as obtained in the prior art syntheses. It is advantageous if the primary particle size of the pigment is <0.2 μm. To carry out the novel process, the pigment to be conditioned is diluted with sufficient water to make the mixture stirrable. In general, from 10 to 20 parts by weight of water are used per part by weight of pigment. The duration of the heat treatment may be varied within wide limits, depending on the desired pigment properties and on the structure of the pigments (I), and is usually from 1 hour to 20 hours.

The temperatures are usually from 90° to 180° C., depending on the desired particle size.

The heat treatment according to the invention can be carried out in the presence of a surfactant but is advantageously carried out in the absence of such compounds.

The resulting pigment suspensions may be worked up in a conventional manner by filtration, and the carboxylic acids can be prevented from crystallizing out from their aqueous solution or suspension by keeping the temperature above 70° C. or by increasing the pH of the aqueous phase to 7.5-8. Residual acids can be removed completely from the filtration residue by washing with hot water and dilute sodium bicarbonate solution.

The Examples which follow illustrate the invention. Parts are by weight.

EXAMPLE 1

32.5 parts of dye (II) (prepared as described in German Laid-Open Application DOS No. 2,628,409, Example (1), in the form of the water-moist filtration residue, are suspended in 350 parts of water. 20 parts of benzoic acid are added, after which the mixture is heated at the boil for 15 hours, cooled to 80° C. and then filtered, and the residue is washed with hot water at 80° C. and then with dilute sodium bicarbonate solution until it is free of benzoic acid, and then dried. 31 parts of a pigmentary form of (II) are obtained which, when incorporated into surface coatings, gives brilliant, high-hiding yellow colorations possessing very good lightfastness and weatherfastness.

If the filtration residue obtained by the prior art method is heated for the same time at the same temperature in the absence of benzoic acid, the resulting pigmentary form gives colorations which have less hiding power, inferior purity of shade and poorer weatherfastness as a full shade.

EXAMPLE 2

The procedure described in Example 1 is followed, except that 30 parts of phthalic anhydride are used instead of the benzoic acid. A pigmentary form having similar properties is obtained.

EXAMPLE 3

The procedure described in Example 2 is followed, except that heating is carried out for 7 hours at 150° C. 28 parts of an extremely coarse-particled pigmentary form are obtained which, when incorporated into surface coatings, gives strongly reddish yellow colorations possessing outstanding weatherfastness.

Without the addition of phthalic acid, only 15 parts of a pigmentary form having a smaller particle size are obtained.

EXAMPLE 4

The procedure described in Example 2 is followed, except that m-toluic acid is used instead of phthalic anhydride. A pigmentary form having similar properties is obtained.

EXAMPLE 5

The procedure described in Example 3 is followed, except that 100 parts of a water-moist filtration residue (30% solids content) of the pigment, prepared as described in German Laid-Open Application DOS No. 3,007,300, Example (1a), are used, and benzoic acid is employed instead of phthalic anhydride. 25 parts of a pigmentary form of the orange pigment of the formula (IV) are obtained. The tinctorial properties and performance characteristics of the resulting pigmentary form are closely similar to the properties of the pigment prepared as described in German Laid-Open Application DOS No. 3,007,300, Example (1b), in dimethylformamide.

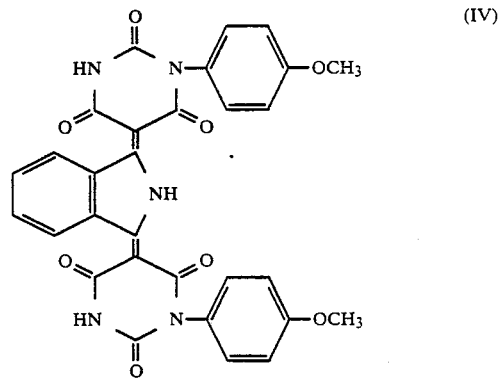

(IV)

EXAMPLE 6

The procedure described in Example 3 is followed, except that 10 parts of a water-moist filtration residue (30% solids Content) of the pigment, prepared as described in German Laid-Open Application Dos No. 3,208,218, Example (1a), are used and benzoic acid is employed instead of phthalic anhydride. 26 parts of the brown pigment of the formula (V) are obtained.

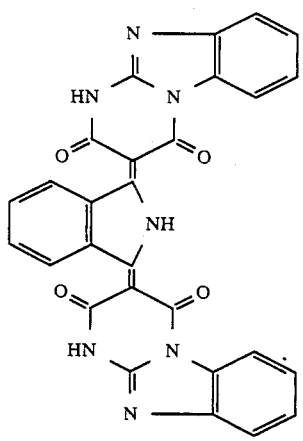

(V)

The tinctorial properties correspond to those of the pigment conditioned as described in Example (1b) of German Laid-Open Application DOS No. 3,208,218.

EXAMPLE 7

The procedure described in Example 1 is followed, except that 32.5 parts of the pigment mixture (prepared as described in German Laid-Open Application DOS No. 3,327,564, Example (1) in the form of the water-moist filtration residue is used.

32 parts of an orange pigment are obtained which, when incorporated into surface openings, has a hue and fastness properties similar to those of the product described in German Laid-Open Application DOS No. 3,327,564, Example 1.

EXAMPLE 8

The procedure described in Example 1 is followed, except that 3 parts of dye (IV), in the form of the moist filtration residue (30% solids content) prepared as described in German Laid-Open Application DOS No. 3,007,300, Example (1a), are also added to the aqueous suspension, and the mixture is then heated as described.

33 parts of a yellow pigment are obtained which, when incorporated into surface coatings, gives deep colorations which are very fast, particularly in shades close to full shade. Compared with the pigmentary form obtained according to Example 1, the resulting pigmentary form exhibits high transparency. This pigment mixture is advantageously used for metallic-effect coats.

We claim:

1. A process for conditioning an isoindoline pigment, wherein an isoindoline pigment of the formula

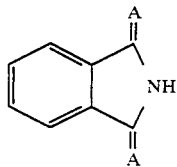

where A is:

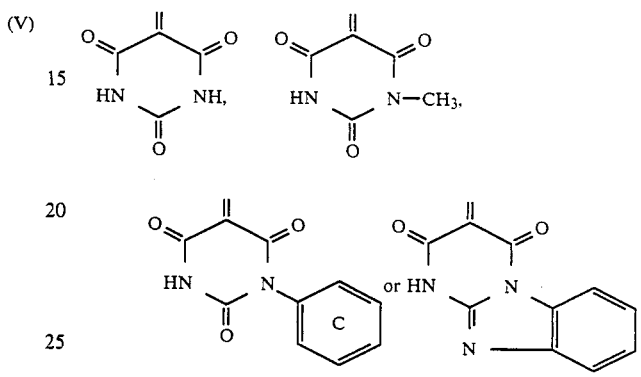

and ring C is unsubstituted or substituted by methoxy, is heated at a temperature of from 90° to 180° C. in a mixture of water and benzoic acid or phthalic acid, and obtaining the pigment as a particulate product.

2. A process for conditioning an isoindoline pigment, wherein a mixture of the isoindoline pigment of the formula

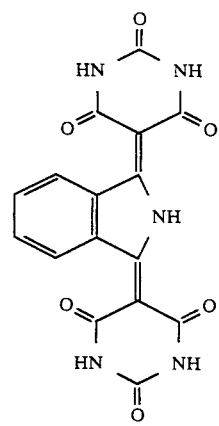

is heated at a temperature of from 90° to 180° C. in a mixture of water and benzoic acid or phthalic acid, and obtaining the pigment as a particulate product.

3. The process of claim 1, wherein from 20 to 200% by weight of benzoic acid or phthalic acid is used, based on the amount of isoindoline pigment used.

4. The process of claim 1, wherein from 50 to 100% by weight of benzoic acid or phthalic acid is used, based on the amount isoindoline pigment used.

5. The process of claim 1, wherein benzoic acid is used.

6. The process of claim 1, wherein phthalic acid is used.

7. The process of claim 2, wherein phthalic acid is used.

8. The process of claim 2, wherein phthalic acid is used.

9. The process of claim 4, wherein benzoic acid is used.

10. The process of claim 1, wherein the mixture of the isoindoline pigment, water and benzoic acid or phthalic acid is heated at a temperature of from 90° to 180° C. for 1 to 20 hours.

11. The process of claim 2, wherein the mixture of the isoindoline pigment, water and benzoic acid or phthalic acid is heated at a temperature of from 90° to 180° C. for 1 to 20 hours.

12. The process of claim 4, wherein the mixture of the isoindoline pigment, water and benzoic acid or phthalic acid is heated at a temperture of from 90° to 180° C. for 1 to 20 hours.

13. The process of claim 6, wherein the mixture of the isoindoline pigment, water and phthalic acid is heated at a temperature of from 90° to 180° C. for 1 to 20 hours.

14. The process of claim 8, wherein the mixture of the isoindoline pigment, water and phthalic acid is heated at a temperature of from 90° to 180° C. for 1 to 20 hours.

15. The process of claim 9, wherein the mixture of the isoindoline pigment, water and benzoic acid is heated at a temperature of from 90° to 180° C. for 1 to 20 hours.

16. A process as claimed in claim 2, wherein from 20 to 200% by weight of benzoic acid is used, based on the amount of pigment used.

17. A process as claimed in claim 16, wherein the mixture of the isoindoline compounds, water and benzoic acid is heated at a temperature of from 90° to 180° C. for 1 to 20 hours.

* * * * *